US012083949B2

(12) United States Patent
Kanj et al.

(10) Patent No.: US 12,083,949 B2
(45) Date of Patent: Sep. 10, 2024

(54) METHOD FOR CONTROLLING A LIGHTING DEVICE FOR EMITTING A PIXELATED LIGHT BEAM

(71) Applicant: VALEO VISION, Bobigny (FR)

(72) Inventors: Ali Kanj, Bobigny (FR); Constantin Prat, Bobigny (FR)

(73) Assignee: VALEO VISION, Bobigny (FR)

( * ) Notice: Subject to any disclaimer, the term of this patent is extended or adjusted under 35 U.S.C. 154(b) by 111 days.

(21) Appl. No.: 17/766,484

(22) PCT Filed: Sep. 30, 2020

(86) PCT No.: PCT/EP2020/077436
§ 371 (c)(1),
(2) Date: Apr. 4, 2022

(87) PCT Pub. No.: WO2021/064063
PCT Pub. Date: Apr. 8, 2021

(65) Prior Publication Data
US 2023/0278484 A1 Sep. 7, 2023

(30) Foreign Application Priority Data
Oct. 4, 2019 (FR) .................................... 19 11048

(51) Int. Cl.
B60Q 1/14 (2006.01)
H05B 45/10 (2020.01)
(Continued)

(52) U.S. Cl.
CPC ........... B60Q 1/1415 (2013.01); H05B 45/10 (2020.01); H05B 45/325 (2020.01); H05B 47/155 (2020.01); B60Q 2300/054 (2013.01)

(58) Field of Classification Search
CPC ...... H05B 45/325; H05B 45/44; H05B 45/10; H05B 45/56; H05B 45/37; H05B 45/48;
(Continued)

(56) References Cited

U.S. PATENT DOCUMENTS 7,521,667 B2 * 4/2009 Rains, Jr. ................ G09F 13/22
362/257
9,769,898 B1 * 9/2017 Buthker ................. H05B 45/10
(Continued)

FOREIGN PATENT DOCUMENTS

FR 3056071 A1 * 3/2018 ............. H05B 45/22
JP 2007-45407 A 2/2007

OTHER PUBLICATIONS

International Search Report issued Dec. 2, 2020 in PCT/EP2020/077436 filed Sep. 30, 2020, 3 pages.
(Continued)

Primary Examiner — Monica C King
(74) Attorney, Agent, or Firm — Oblon, McClelland, Maier & Neustadt, L.L.P.

(57) ABSTRACT

A method for controlling a lighting device of a motor vehicle including at least one lighting module having a plurality of light sources, each of the light sources being designed to emit a luminous pixel, and a controller able to selectively control each of the light sources by applying thereto an electrical signal having a parameter of a value determined for the emission of a luminous pixel of given brightness.

20 Claims, 2 Drawing Sheets

(51) Int. Cl.
*H05B 45/325* (2020.01)
*H05B 47/155* (2020.01)

(58) Field of Classification Search
CPC ........ H05B 45/18; H05B 45/46; H05B 45/50;
H05B 45/60; H05B 47/18; H05B 45/14;
H05B 45/3725; H05B 45/395; H05B
45/22; H05B 45/345; H05B 45/375;
H05B 45/38; H05B 45/385; H05B 45/40;
F21S 41/153; F21S 43/15; F21S 41/141;
F21S 43/14
See application file for complete search history.

(56) References Cited

U.S. PATENT DOCUMENTS

| 9,900,950 | B1 | 2/2018 | Buthker |
| 2003/0123705 | A1 | 7/2003 | Stam et al. |
| 2003/0123706 | A1 | 7/2003 | Stam et al. |
| 2004/0239243 | A1* | 12/2004 | Roberts ................ B60Q 1/2696 |
| | | | 257/E25.02 |
| 2006/0018511 | A1 | 1/2006 | Stam et al. |
| 2008/0129206 | A1 | 6/2008 | Stam et al. |
| 2010/0238189 | A1* | 9/2010 | Feng .................... G09G 3/3426 |
| | | | 345/589 |
| 2017/0042002 | A1 | 2/2017 | Asamura et al. |
| 2021/0345466 | A1* | 11/2021 | Zojceski ................ H05B 45/44 |
| 2023/0013166 | A1* | 1/2023 | Kawabata ............ H05B 47/105 |
| 2023/0269842 | A1* | 8/2023 | Kanj .................... F21S 41/141 |
| | | | 362/459 |
| 2023/0337343 | A1* | 10/2023 | Lopez Julia ........... H05B 47/11 |

OTHER PUBLICATIONS

Japanese Notice of Reasons for Refusal issued Jul. 4, 2023 in Japanese Application No. 2022-520629, (with English translation), 10 pages.
Office Action issued Oct. 18, 2023, in corresponding Chinese Patent Application No. 202080070087.3, 4 pages.

* cited by examiner

METHOD FOR CONTROLLING A LIGHTING DEVICE FOR EMITTING A PIXELATED LIGHT BEAM

The invention relates to the field of motor vehicle lighting. The invention relates more specifically to a method for controlling a lighting device so as to emit a highly pixelated light beam.

In the field of motor vehicle lighting, lighting modules are known that comprise enough selectively controllable light sources to allow pixelated lighting functions to be implemented, for example containing at least 500 pixels, each pixel being formed by an elementary light beam emitted by one of the light sources. This type of module allows the host vehicle to implement for example anti-dazzle high beam functions, in which some pixels of the high beam are turned off or attenuated in order to form a dark area at the level of a target object, such as a followed or passing target vehicle, so as to avoid dazzling it.

In order to control the emission of a pixelated lighting function, it is known to use a controller that selectively controls each of the light sources and that is supplied with a digital image of a pixelated light beam to be emitted to implement this pixelated lighting function. The digital image defines, for each light source of the lighting module, a setpoint value corresponding to the light intensity of the light pixel that this light source has to emit. The controller thereafter generates, from each setpoint value, a configurable electrical signal, which it applies to this source in order to emit a light pixel whose light intensity corresponds to the setpoint value, such that the set of emitted pixels forms the pixelated light beam.

Known lighting modules for emitting a pixelated light function may comprise multiple types of technologies, including matrices of light-emitting diodes and monolithic pixelated light sources. However, these types of technology involve high proximity between the light sources, which creates interference (also called crosstalk) in the elementary beams emitted by neighboring light sources. It has thus been observed that the light intensity of a pixel supposedly emitted by one of the light sources does not correspond to the setpoint value associated with this light source. Specifically, only a portion of the elementary beam emitted by this light source is used to produce the pixel and a portion of the elementary beams emitted by the neighboring light sources is further added thereto. The resulting light intensity is thus different from the expected setpoint value, which makes controlling the lighting module so as to emit a pixelated light beam conforming to that of the digital image provided to the controller complex and unreliable.

The present invention falls within this context and aims to address the identified problem, by proposing a method for controlling a lighting device so as to emit a pixelated beam in which the light intensities of the emitted pixels comply with the values of setpoints provided to the lighting device.

To this end, one subject of the invention is a method for controlling a lighting device of a motor vehicle comprising at least one lighting module comprising a plurality of light sources, each of the light sources being designed to emit a light pixel, and a controller able to selectively control each of the light sources by applying to it an electrical signal having a parameter of a determined value so as to emit a light pixel with a given light intensity. According to the invention, the method comprises the following steps:

a. defining, in advance, a conversion function of the lighting module for converting the value of said parameter into a light intensity emitted by the light sources by way of at least one measurement of the light intensity emitted by the light sources when the controller applies to them an electrical signal having a predetermined value of said parameter;

b. receiving a plurality of setpoint values for the emission of a desired pixelated light beam, each setpoint value being a light intensity of a light pixel of the desired pixelated light beam to be emitted by one of the light sources of said lighting module;

c. determining, from each setpoint value, a value of said parameter using said conversion function defined in advance;

d. controlling each of the light sources by applying to it said electrical signal having said determined value of said parameter so as to emit the pixelated light beam.

Although it is not possible to precisely determine the extent to which a light source impacts its neighbors, the resulting intensity of all of the interference remains measurable. By virtue of the invention, advance empirical determination of the influences of neighboring light sources exerted on each light source is thus implemented by measuring the light intensity emitted by these light sources when they are controlled in a predetermined manner. This is used to deduce a conversion function that makes it possible to compensate for these influences, and for each of the light sources, a value of the parameter is determined by virtue of this conversion function, such that the light intensity of a pixel actually emitted by this light source corresponds substantially to its setpoint value.

Controlling a light source is understood to mean controlling its light intensity to a value of zero in order to turn off the corresponding light pixel, reducing its light intensity in order to attenuate the corresponding pixel, controlling its light intensity to a predetermined maximum value in order to turn the corresponding pixel back on, or else increasing its luminous intensity in order to enhance the corresponding pixel.

Advantageously, said electrical signal is a pulse width-modulated electrical signal, said parameter being the duty cycle of this electrical signal.

In one embodiment of the invention, the step of defining the conversion function in advance comprises a single sub-step of measuring the light intensity of the light beam emitted by the lighting module when the controller applies one and the same electrical signal having one and the same predetermined value of said parameter to all of the light sources. It is thus assumed that the interference phenomena between neighboring light sources are homogeneous, so as to simplify the computing operations of the controller. For example, the measuring sub-step may consist in measuring the maximum intensity of the emitted light beam. If appropriate, the measuring sub-step may be performed by applying, to all of the light sources, a pulse width-modulated electrical signal having one and the same duty cycle of less than 100%, for example equal to 20% or 30%. This thus avoids subjecting the light sources to high thermal stresses in the step of defining the conversion function. Preferably, the conversion function defined in advance is a linear function whose coefficient is equal to the ratio between the measured light intensity and the predetermined value of said parameter.

Advantageously, the conversion function is defined for the whole of the lighting module, or in other words, the conversion function is the same for all of the light sources of the lighting module. According to one variant of the invention, the conversion function may be broken down into sub-functions, each one being assigned to groups of light sources, or even to single light sources, and being defined according to the geographical position of the light source or of the group of light sources to which it is assigned.

In another embodiment of the invention, the step of defining the conversion function in advance may comprise multiple sub-steps of measuring the light intensity of the light beam emitted by the lighting module when the controller applies one and the same electrical signal having multiple predetermined values of said parameter to all of the light sources. If appropriate, the conversion function defined in advance may be a non-linear function extrapolated from the measured light intensity values, for example a logarithmic function or a polynomial function.

Advantageously, the step of defining the conversion function in advance comprises storing said function in a memory of the controller.

Advantageously, the step of receiving a plurality of setpoint values for the emission of a desired pixelated light beam may comprise a sub-step of receiving a digital image of the desired pixelated light beam, a sub-step of splitting said digital image into a plurality of regions, each region being associated with one of the light sources of the lighting module and a sub-step of computing a setpoint value for each of the light sources of the lighting module from the region associated with this light source. In other words, the digital image is split into as many regions as the lighting module comprises light sources, each region corresponding to the pixel able to be emitted by one of these light sources. For example, the setpoint value assigned to each of the light sources may correspond to the average light intensity in the region associated with this light source.

Advantageously, the step of determining the values of said parameter comprises computing the image from each setpoint value using the reciprocal function of the conversion function defined in advance.

According to one exemplary embodiment of the invention, the pixelated light beam is a light beam comprising a plurality of pixels, for example 500 pixels of dimensions between 0.05° and 0.30°, for example 0.28°, distributed over a plurality of rows and columns, for example 20 rows and 25 columns.

A light source is understood to mean any light source optionally associated with an electro-optical element, capable of being selectively activated and controlled so as to emit an elementary light beam, the light intensity of which is controllable. This could in particular be a light-emitting semiconductor chip, a light-emitting element of a monolithic pixelated light-emitting diode, a portion of a light-converting element able to be excited by a light source, or even a light source associated with a liquid crystal or with a micromirror.

Another subject of the invention is a computer program comprising a program code that is designed to implement the method according to the invention.

Another subject of the invention is a data medium on which the computer program according to the invention is recorded.

The present invention is now described with the aid of examples that are only illustrative and in no way limit the scope of the invention, and with reference to the accompanying illustrations, in which:

FIG. 1 schematically and partially shows a lighting device of a motor vehicle;

In the following description, elements that are identical in terms of structure or in terms of function and that appear in various figures have been designated with the same reference, unless otherwise indicated.

Figure 1:
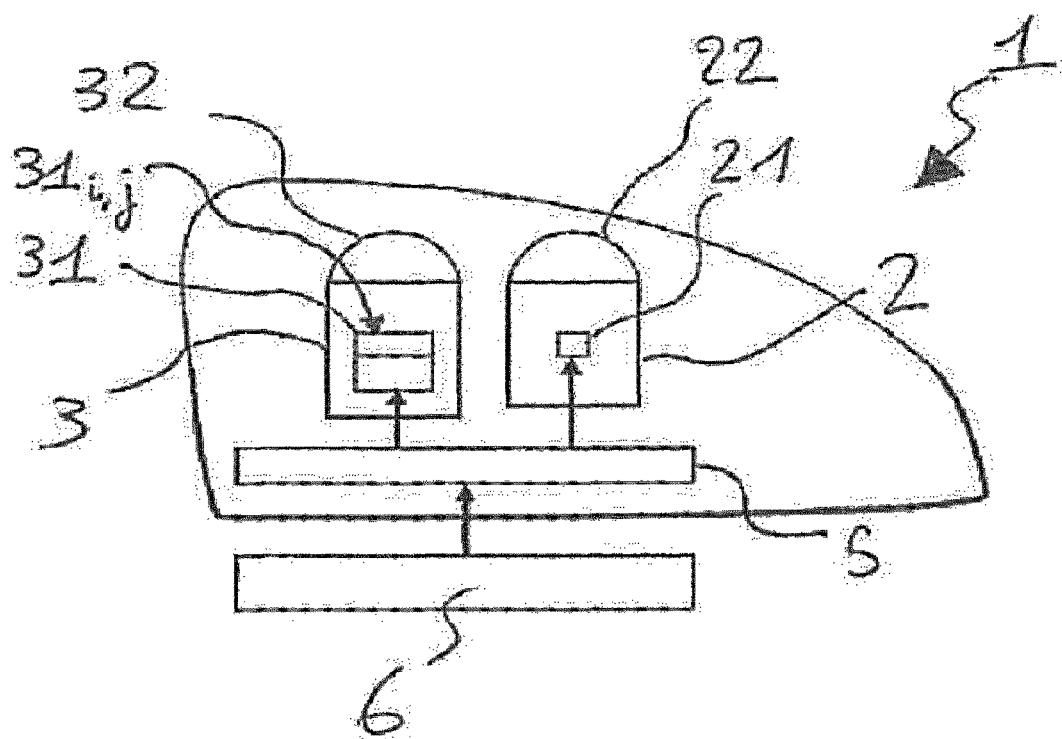

FIG. 1 shows a right-hand lighting device 1 of a motor vehicle, comprising two lighting modules 2 and 3. The lighting module 2 comprises a light source 21 associated with a lens 22 for emitting a low-beam light beam. The lighting module 3 comprises a pixelated light source 31 associated with a lens 32 for emitting a high-resolution pixelated light beam HD. In the example described, the pixelated light source 31 is a monolithic pixelated light-emitting diode, each of the light-emitting elements of which forms a light source $31_{i,j}$ that is able to be selectively activated and controlled by an integrated controller so as to emit an elementary light beam, the light intensity of which is able to be controlled, and thus forming one of the pixels of the pixelated light beam. In the example described, the pixelated light beam HD comprises around 5000 pixels with dimensions of 0.2°, distributed over 135 columns and 37 rows.

The lighting device 1 comprises a controller 5 designed to control the light source 21 and the integrated controller of the pixelated light source 31 so as to selectively control the turning on, the turning off and the modification of the light intensity of each of the pixels of the pixelated light beam, along with the turning on or the turning off of the beam, based on information received from a computer 6 of the host vehicle.

More specifically, the controller 5 receives, from the computer 6, a digital image of a pixelated light beam to be emitted defining, in grayscale, the light intensities of this beam. As will be described below, the controller 5 defines a duty cycle value based on this digital image and for each of the light sources $31_{i,j}$, and transmits these values to the integrated controller of the pixelated light source 31, which generates and applies, to each of the light sources $31_{i,j}$, an electrical signal that is pulse width-modulated in accordance with the associated duty cycle value so as to emit a light pixel, the set of pixels thus forming the pixelated light beam to be emitted.

Figure 2:
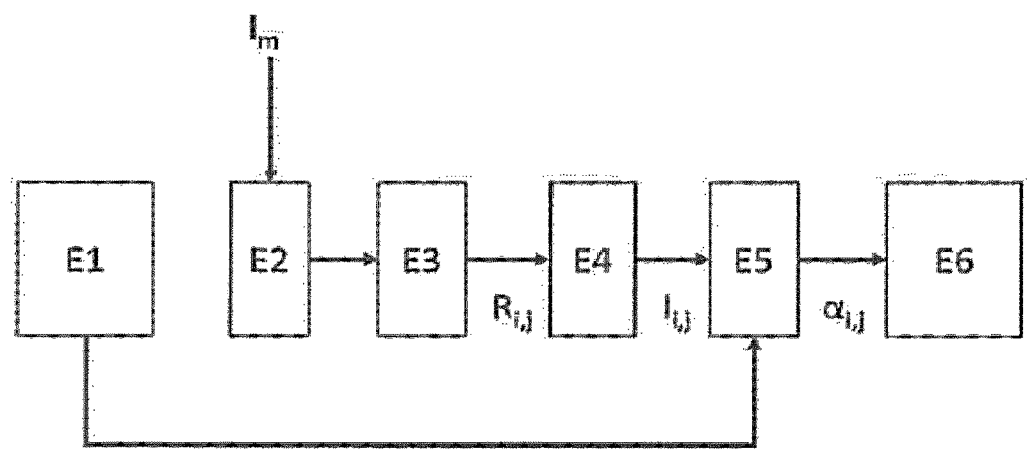
FIG. 2 shows a method for controlling the lighting device of FIG. 1 according to one embodiment of the invention.

FIG. 2 shows a method for controlling the lighting device 1, in particular implemented by the controller 5 and the integrated controller of the pixelated light source 31.

In a first step E1, for example performed at the end of the production of the lighting device 1 or before the first drive of the motor vehicle equipped with the lighting device 1, a conversion function of the lighting module 3 will be defined for converting between the duty cycle values defined by the controller 5 and the light intensity of the elementary light beams emitted by the light sources $31_{i,j}$ of the pixelated light source 31.

Figure 3:
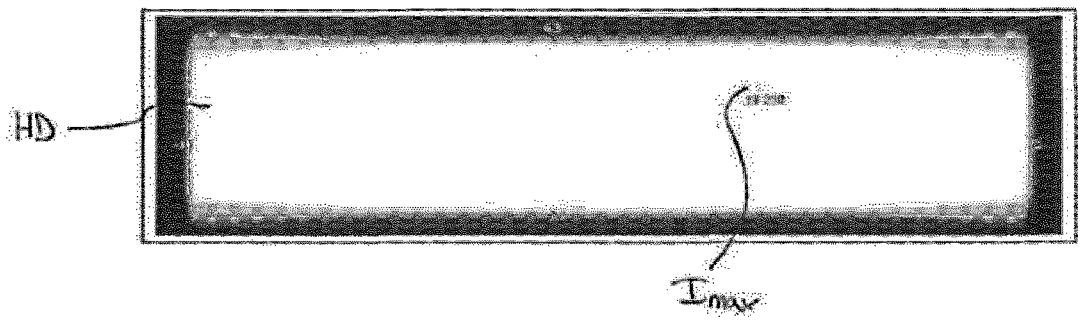
FIG. 3 shows one example of a pixelated light beam emitted by the lighting device of FIG. 1 in a step of the method of FIG. 2.

To this end, the controller 5 will sequentially transmit a plurality of predetermined duty cycle values to the integrated controller of the pixelated light source 31 in such a way that the pixelated light source 31 emits multiple complete pixelated light beams having various intensities. The predetermined values are duty cycle values increasing at regular intervals, from 0 to 100%. All of the light sources $31_{i,j}$ are thus controlled in the same way, all of the pixels thus being turned on for each duty cycle occurrence, each light beam thus forming a "blank page" of increasing intensity. FIG. 3 shows one example of a "blank page" formed by the pixelated light beam HD emitted by the lighting module 3 for a duty cycle of 20%.

For each duty cycle occurrence, the maximum intensity Imax of the pixelated light beam emitted by the lighting module 3 is measured. Lastly, the various measured light intensity values are extrapolated in order to define a conversion function for converting between duty cycle and light intensity actually emitted. In the example described, the extrapolated conversion function is a second-degree polynomial function defined by the following equation:

$$I_m = 0.76\alpha + 0.24\alpha^2, \qquad \text{[Math. 1]}$$

where $I_m$ is the light intensity actually emitted and $\alpha$ is the duty cycle of the electrical signal applied to the pixelated light source 31.

At the end of step E1, the conversion function is stored in a memory of the controller 5.

Figure 4:
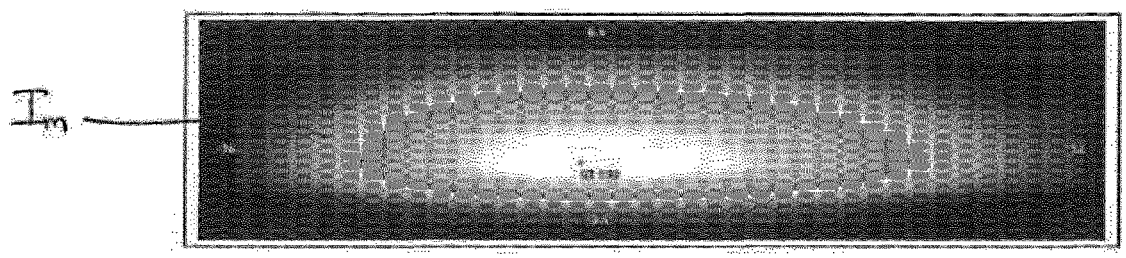
FIG. 4 shows one example of a digital image received by the lighting device of FIG. 1 in a step of the method of FIG. 2.

In a step E2, the controller 5 receives, from the computer 6, a digital image Im of a pixelated light beam to be emitted by the lighting module 3. One example of a digital image Im has been shown in FIG. 4. Each of the points of the digital image Im represents a light intensity of the desired pixelated light beam in a point in space.

Figure 5:
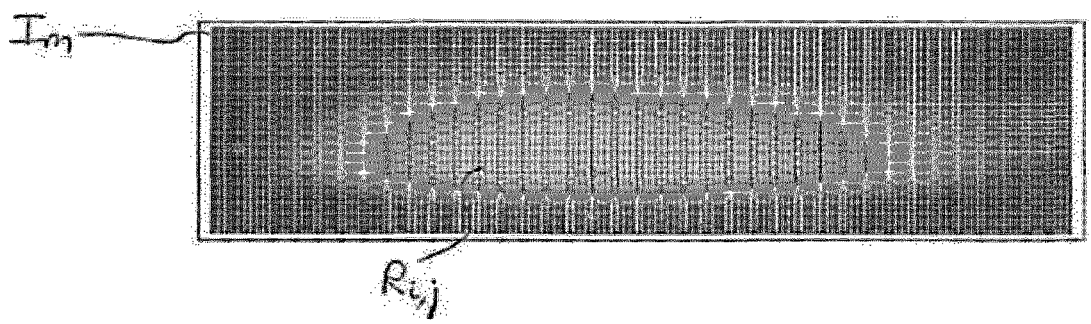
FIG. 5 shows one example of splitting the digital image of FIG. 4 in a step of the method of FIG. 2.

In a step E3, the controller 5 splits the digital image Im into as many regions $R_{i,j}$ as the pixelated light source 31 comprises light sources $31_{i,j}$, each region $R_{i,j}$ thus being associated with one of these light sources $31_{i,j}$ and corresponding, in terms of size and shape, to the pixel able to be emitted by this light source $31_{i,j}$. One example of a split image Im has been shown in FIG. 5.

In a step E4, the controller 5 computes, for each of the light sources $31_{i,j}$, a setpoint value $I_{i,j}$ corresponding to the average light intensity of the region $R_{i,j}$ associated with this light source $31_{i,j}$. This setpoint value thus corresponds to the light intensity of the pixel to be emitted by this light source $31_{i,j}$, such that the set of pixels forms the desired pixelated light beam.

In a step E5, the controller 5 determines a duty cycle value $\alpha_{i,j}$ from each of the setpoint values $I_{i,j}$ and from the conversion function defined in advance. For example, the duty cycle value may be determined by way of the reciprocal function of the conversion function, defined by the following equation:

$$\alpha_{i,j} = 1.24 I_{i,j} - 0.24 I_{i,j}^2 \qquad \text{[Math. 2]}$$

Finally, in a step E6, all of the duty cycle values $\alpha_{i,j}$ are transmitted, by the controller 5, to the integrated controller of the pixelated light source 31. This integrated controller $31_{i,j}$ generates and applies, to each of the light sources $31_{i,j}$, an electrical signal that is pulse width-modulated in accordance with the associated duty cycle value $\alpha_{i,j}$ so as to emit a light pixel whose light intensity corresponds substantially to the setpoint value $I_{i,j}$.

The above description clearly explains how the invention makes it possible to achieve the objectives that it has set itself, in particular by proposing a method for controlling a lighting device that, through advance empirical definition of a conversion function for converting between duty cycle and light intensity actually emitted, makes it possible to take into account and compensate for the mutual interference of the light sources of a lighting module, such that the pixelated light beam actually emitted by the lighting module complies with the light intensity instructions given to the lighting module.

In any event, the invention should not be regarded as being limited to the embodiments specifically described in this document, and extends, in particular, to any equivalent means and to any technically operative combination of these means. In particular, it is possible to contemplate types of conversion function other than the one described, and in particular linear conversion functions determined from a single measurement of the light intensity or even composite conversion functions defined for each light source or else for groups of light sources.

The invention claimed is:

1. A method for controlling a lighting device of a motor vehicle comprising at least one lighting module comprising a plurality of light sources, each of the light sources being designed to emit a light pixel, and a controller configured to selectively control each of the light sources by applying an electrical signal having a parameter of a determined value so as to emit a light pixel with a given light intensity, the method comprising:
    receiving a plurality of setpoint values for an emission of a desired pixelated light beam, each setpoint value being a light intensity of a light pixel of the desired pixelated light beam to be emitted by one of the light sources of said lighting module;
    determining, from each setpoint value, a value of said parameter using a conversion function defined in advance, wherein defining the conversion function, for converting the value of said parameter into a light intensity emitted by the light sources so that the given light intensity corresponds to the setpoint values, in advance includes measuring at least one step of a light intensity emitted by the light sources when the controller applies an electrical signal having a predetermined value of said parameter to the light sources; and
    controlling each of the light sources by applying said electrical signal having said determined value of said parameter so as to emit the pixelated light beam.

2. The control method as claimed in claim 1, wherein said electrical signal is a pulse width-modulated electrical signal, said parameter being a duty cycle of the electrical signal.

3. The control method as claimed in claim 1, wherein the at least one step comprises a single sub-step of measuring the light intensity of the light beam emitted by the lighting module when the controller applies one and the same electrical signal having one and the same predetermined value of said parameter to all of the light sources.

4. The control method as claimed in claim 3, wherein the conversion function defined in advance is a linear function whose coefficient is equal to a ratio between the measured light intensity and the predetermined value of said parameter.

5. The control method as claimed in claim 1, wherein the at least one step comprises multiple sub-steps of measuring the light intensity of the light beam emitted by the lighting module when the controller applies one and the same electrical signal having multiple predetermined values of said parameter to all of the light sources.

6. The control method as claimed in claim 5, wherein the conversion function defined in advance is a non-linear function extrapolated from the measured light intensity values.

7. The control method as claimed in claim 1, wherein the at least one step comprises storing said function in a memory of the controller.

8. The control method as claimed in claim 1, wherein the receiving comprises
- a sub-step of receiving a digital image of the desired pixelated light beam,
- a sub-step of splitting said digital image into a plurality of regions, each region being associated with one of the light sources of the lighting module, and
- a sub-step of computing a setpoint value for each of the light sources of the lighting module from the region associated with the light source.

9. The control method as claimed in claim 1, wherein the determining comprises computing an image from each setpoint value using a reciprocal function of the conversion function defined in advance.

10. A computer program comprising a program code that is designed to implement the method as claimed in claim 1.

11. A data medium on which the computer program as claimed in claim 10 is recorded.

12. The control method as claimed in claim 2, wherein the at least one step comprises a single sub-step of measuring the light intensity of the light beam emitted by the lighting module when the controller applies one and the same electrical signal having one and the same predetermined value of said parameter to all of the light sources.

13. The control method as claimed in claim 2, wherein the at least one step comprises multiple sub-steps of measuring the light intensity of the light beam emitted by the lighting module when the controller applies one and the same electrical signal having multiple predetermined values of said parameter to all of the light sources.

14. The control method as claimed in claim 2, wherein the at least one step comprises storing said function in a memory of the controller.

15. The control method as claimed in claim 2, wherein the receiving comprises
- a sub-step of receiving a digital image of the desired pixelated light beam,
- a sub-step of splitting said digital image into a plurality of regions, each region being associated with one of the light sources of the lighting module, and
- a sub-step of computing a setpoint value for each of the light sources of the lighting module from the region associated with the light source.

16. The control method as claimed in claim 2, wherein the determining comprises computing an image from each setpoint value using a reciprocal function of the conversion function defined in advance.

17. A computer program comprising a program code that is designed to implement the method as claimed in claim 2.

18. The control method as claimed in claim 3, wherein the at least one step further comprises storing said function in a memory of the controller.

19. The control method as claimed in claim 3, wherein the receiving comprises
- a sub-step of receiving a digital image of the desired pixelated light beam,
- a sub-step of splitting said digital image into a plurality of regions, each region being associated with one of the light sources of the lighting module, and
- a sub-step of computing a setpoint value for each of the light sources of the lighting module from the region associated with the light source.

20. The control method as claimed in claim 3, wherein the determining comprises computing an image from each setpoint value using a reciprocal function of the conversion function defined in advance.

* * * * *